United States Patent Office 3,772,212
Patented Nov. 13, 1973

3,772,212
PROCESS FOR PREPARING FLUIDIZED BED CATALYST FOR PRODUCTION OF AROMATIC NITRILES
Masao Saito and Takashi Okawa, Niigata, Japan, assignors to Mitsubishi Gas-Chemical Company, Inc., Tokyo, Japan
No Drawing. Filed Dec. 27, 1971, Ser. No. 212,755
Claims priority, application Japan, Dec. 29, 1970, 46/125,671
Int. Cl. B01j 11/82
U.S. Cl. 252—432          10 Claims

ABSTRACT OF THE DISCLOSURE

Fluidized bed catalyst having an atomic ratio of V:Cr:B of 1:0.5–2.0:0.1–1.2, a total amount of their oxides carried on the catalyst being 20 to 80% by weight, based on the weight of the catalyst and a closed bulk density of 0.85 to 1.20 g./ml. is prepared by spray-drying a silica sol slurry containing a vanadium compound, a chromium compound and a boron compound especially prepared by using a dissolution agent for the boron compound, for example, a cis-polyhydric alcohol having hydroxyl groups at an α- or β-position mutually or an α-hydroxycarboxylic acid, at an outlet temperature of a spray-drier of 85° to 160° C. The catalyst is useful for the production of aromatic nitriles by fluidized bed method.

---

This invention relates to a process for preparing a fluidized bed catalyst for production of aromatic nitriles, the catalyst comprising a vanadium oxide, a chromium oxide and a boron oxide as catalyst components, and silica as a carrier.

It is well known from Japanese Pat. No. 618,714 that a catalyst of three-components system comprising vanadium, chromium and boron has a very excellent activity as a catalyst for producing aromatic nitriles. However, the catalyst disclosed therein is mainly directed to the reactions based on a fixed bed, and is not always ideal as a catalyst for the fluidized bed reaction. That is to say, it is necessary that industrially applicable fluidized bed catalysts have a substantially spherical form, an appropriate particle size distribution and a good attrition resistance. Furthermore, their closed bulk densities must be within a constant range corresponding to a reaction condition.

An object of the present invention is to provide a process for preparing a fluidized bed catalyst having a very excellent catalytic activity in the production of aromatic nitriles, which can satisfy the above-mentioned requirements.

According to the present invention, a catalyst is prepared by dissolving each catalyst component of vanadium, chromium and boron in a silica sol thereby to prepare a slurry solution, spray-drying the solution in counter-current or co-current contact with air, and calcining the resulting dried particles. To attain the object of the present invention, it is necessary to solve a considerably large amount of each of said catalyst components in the silica sol. Solubilities in water of both vanadium and chromium components can be increased to concentrations necessary for the preparation of a catalyst generally by using oxalic acid as a dissolution agent, but the solubility in water of a boron compound is small and thus a catalyst having a high boron content cannot be obtained when the boron compound is added thereto in a form of aqueous solution. Furthermore, a catalyst having a thin shell wall and small closed bulk density can be only obtained in that case. According to the present invention, a novel dissolution agent is used to increase the solubility of boron compound and enhance a boron content of the catalyst.

When a fluidized bed catalyst for the production of aromatic nitriles is prepared by spray-drying a silica sol containing three components, i.e. vanadium, chromium and boron components, a water-soluble compound selected from (1) cis-polyhydric alcohols having hydroxyl groups at an α- or β-position mutually and (2) α-hydroxycarboxylic acid is used in the present invention as the dissolution agent for the boron compound. The polyhydric alcohols having hydroxyl groups at the α-position mutually used in the present invention include, for example, glycerine, erythritol, ethylene glycol, propylene glycol (1,2), mannitol, catechol, etc. The polyhydric alcohols having hydroxyl groups at the β-position mutually used in the present invention include, for example, pentaerythritol, 1,3-propanediol, etc. The α-hydroxycarboxylic acids used in the present invention include tataric acid, malic acid, etc. These dissolution agents can dissolve not only a large amount of a boron compound, but also have a high solubility in water. Therefore, a silica sol slurry having a very high boron content can be obtained by using these dissolution agents, and further a catalyst having the above-mentioned characteristics necessary for the fluidized bed catalyst can be prepared thereby.

In preparing the present catalyst, vanadium compound and chromium compound are dissolved in each aqueous solutions of oxalic acid, whereas a boron compound is dissolved in said dissolution agent separately. Then, these solutions are mixed together. It is necessary to prepare each solution containing one of these catalyst components separately and then mix the resulting solutions together. It is not preferable to prepare a solution containing all of these catalyst components at once, because there may occur precipitation. It is preferable to add at least one mole of the dissolution agent to one mole of undissolved boron compound which precipitates in an aqueous catalyst solution by saturation.

Preferable atomic ratio of vanadium:chromium:boron of the present catalyst is 1:0.5–2.0:0.1–1.2, and a preferable total amount of their oxides carried on the carrier is 20–80% by weight, based on the total weight of the catalyst when the respective oxides are defined as $V_2O_5$, $Cr_2O_3$ and $B_2O_3$. Particularly preferable atomic ratio of vanadium:chromium:boron of the present catalyst is 1:0.7–1.5:0.3–1.0, and particularly preferable total amount of the catalyst components carried on the carrier is 30–60% by weight.

As raw materials for components of vanadium oxide, chromium oxide and boron oxide used in the present catalyst, their respective oxides can be used as such, or various compounds capable of being readily converted to the corresponding oxides by heating or proper treatment when a catalyst is to be prepared can be used. For example, ammonium metavanadate, vanadyl sulfate, vanadyl oxalate, vanadyl tartarate, etc. are used for the vanadium component. Chromic acid, chromium nitrate, ammonium chromate, chromium oxalate, chromium tartartae, etc. are used for the chromium component. Boric acid, ammonium borate, etc. are used for the boron component.

These raw materials of catalyst components are dissolved into the respective solutions separately, and the resulting solutions are then added to a silica sol, whereby a slurry mixture is obtained. The resulting slurry mixture is spray-dried through a counter-current or co-current contact with air. At that time, it is desirable to carry out the spray drying at a spray drier outlet gas temperature of 85° to 160° C., preferably 95° to 150° C. The spray-dried product is further dried in a roasting oven at a temperature of about 200° to about 250° C. for at least 5 hours and then calcined in a calcining oven at a temperature of 400° to 650° C., preferably about 450° to about 600° C., for 5 to 20 hours.

The catalysts obtained according to the present invention take substantially spherical forms and have an attrition resistance almost equal to that of silica-alumina catalysts for the fluidized catalytic cracking known as the so-called FCC catalysts. That is, the attrition resistance of the present catalyst is 0.3% by weight or less per hour according to ACC method. Even after a prolonged attrition test according to ACC method, the composition of the present catalyst is not substantially changed from that before the attrition test, and any specific component is never lost selectively after the attrition test. Furhermore, the amount of catalyst components carried on the carrier is larger and the closed bulk density of the catalyst is as high as 0.85 to 1.2 g./ml. The catalytic activity is excellent and the mean particle size distributes in 40–80$\mu$.

When reaction is carried out in a fluidized bed using the catalyst prepared according to the present invention, such alkyl-substituted aromatic compounds as toluene, ethylbenzene, xylene, diethylbenzene, mesitylene, diisopropylbenzene, cymene, methylnaphthalene, etc. can be converted to the corresponding nitriles in high yield.

A concentration of the aromatic compound in the reaction gas is preferably 0.5 to 4% by volume when air is used as an oxygen source.

When an ammonia concentration of the reaction gas is higher than the theoretical one (one mole of ammonia to one mole of the alkyl group), nitriles can be produced from the aromatic compound in a little advantageously higher yield, but in view of recovery technique for the unreacted ammonia, etc. it is advantageous to use an ammonia of 2 to 10 times as high as the theoretical one.

It is necessary that an oxygen concentration of the reaction gas is at least 1.5 times higher than the theoretical one, preferably 3 to 50 times as high as the theoretical one. Usually, air is used as the oxygen source. In addition, nitrogen, carbon dioxide, steam, etc. can be used as an inert diluent.

The reaction can be carried out in a wide temperature range of 300° to 500° C., but preferably 330° to 450° C. At a temperature less than 300° C., the conversion of the raw material aromatic compound is low. At a temperature above 500° C., carbon dioxide, hydrogen cyanide, etc. are formed, and consequently the yield is reduced. Since the reaction temperature for a maximum yield somewhat depends upon the kind of aromatic compound use, its concentration and contact time, it must be properly selected from said temperature range in view of the given conditions.

The contact time of the reaction gas with the catalyst can be generally selected with a considerably large allowance, but is preferably about 0.5 ot about 30 seconds. Now, the present invention will be explained in detail, referring to examples.

EXAMPLE 1

618 grams of oxalic acids was added to 500 ml. of water heated at 80° to 90° C. in water bath and dissolved in water by heating. Then, 247 g. of vanadium pentoxide was slowly added thereto with stirring and dissolved. 1,018 g. of oxalic acid was added to 900 ml. of water, and 272 g. of chromium trioxide was slowly added thereto with stirring and dissolved. 83.9 g. of boric acid was added to 326 g. of glycerine heated at 40° to 50° C. and dissolved therein. These three solutions were mixed together, and added to 1,670 g. of a low alkaline, aqueous 30% colloidal silica sol, and thoroughly mixed. The resulting slurry mixture was spray-dried while keeping an inlet gas temperature at 250° C., and an outlet gas temperature at 120° C. The spray-dried product was dried in a roasting oven at 250° C. for about 12 hours, and further calcined in a calcining oven at 450° C. for 20 hours under air circulation. The resulting catalyst had an atomic ratio of vanadium:chromium:boron being 1:1:0.5, and the total amount of these components carried on the catalyst in terms of $V_2O_5$, $Cr_2O_3$ and $B_2O_3$ was 50% by weight, based on the weight of the catalyst. Microscopic observation of the catalyst revealed that the catalyst was substantially spherical, and its closed bulk density was 1.0 g./ml. and its mean particle size was 72$\mu$. According to the attrition test of the catalyst by ACC method, it was found that the attrition resisance was 0.22% by weight per hour. The result of the attrition test of a commercially available FCC catalyst, i.e. silica-alumina catalyst typical for the fluidized bed catalyst, according to ACC method was 0.26% by weight per hour. 40 ml. of the catalyst was filled in a stainless steel reactor having an inner diameter of 21 mm., which was heated in a nitro bath, and a gas mixture consisting of 1.21% by volume of metaxylene, 13.80% by volume of ammonia and 84.99% by volume of air was passed therethrough at a reaction temperature of 402° C. and a space velocity of 710 hr.$^{-1}$. As a result, 83.4% by mole of isophthalonitrile and 1.7% by mole of metatolunitrile were obtained on the basis of the supplied metaxylene.

EXAMPLE 2

1,236 grams of oxalic acid was added to 1,000 ml. of water heated at 80° to 90° C., heated and dissolved. 494 grams of vanadium pentoxide was slowly added thereto and dissolved. Separately, 2,036 g. of oxalic acid was added to 1,800 ml. of water, and 544 g. of chromium trioxide was slowly added with stirring under heating, and dissolved. These two solutions were mixed, concentrated to 2,600 ml., an almost saturated solution, by heating, then cooled to room temperature, mixed into 3,332 g. of the same silica sol used in Example 1, and thoroughly stirred. 400 grams of tartaric acid and 168 g. of boric acid were added to the resulting sol mixture, and dissolved with thorough mixing. The resulting slurry solution containing vanadium, chromium and boron was spray-dried, while keeping an inlet gas temperature at 230° C. and an outlet gas temperature at 115° C. The spray-dried product was dried in a roasting oven at 250° C. for about 12 hours and then calcined in a calcining oven at 550° C. for 12 hours. The thus obtained catalyst had an atomic ratio of vanadium:chromium:boron being 1:1:0.5, and the total amount of the catalyst components carried on the catalyst in terms of $V_2O_5$, $Cr_2O_3$ and $B_2O_3$ was 50% by weight, based on the weight of the catalyst. Microscopic observation of the catalyst revealed that the catalyst was substantially spherical, and its closed bulk density was 1.02 g./ml. Its mean particle size was 70$\mu$. The result of an attrition test of the catalyst according to ACC method was 0.20% by weight per hour. 40 ml. of the catalyst was filled in the same reactor as used in Example 1, and a gas mixture consisting of 1.27% by volume of metaxylene, 13.22% by volume of ammonia and 85.51% by volume of air was passed therethrough at a reaction temperature of 400° C. and space velocity of 649 hr.$^{-1}$. As a result, 83.2% by mole of isophthalonitrile and 3.0% by mole of metatolunitrile were obtained on the basis of the supplied metaxylene.

EXAMPLE 3

84 grams of boric acid was added to 1,670 g. of aqueous 30% colloidal silica sol together with the following dissolution agent and dissolved therein. Other operation was conducted in the same manner with Example 1 and the same result was obtained.

| Dissolution agent: | Weight added, gram |
|---|---|
| Lactic acid | 162 |
| Malic acid | 220 |
| Pentaerythritol (200 g. of water was added) | 95 |
| Mannitol | 150 |
| Catechol | 180 |
| Propylene glycol | 400 |

What is claimed is:

1. A process for preparing a fluidized bed catalyst for production of aromatic nitriles by spray-drying a silica sol slurry containing a vanadium oxide, a chromium oxide and a boron oxide, which comprises using a water-soluble compound selected from the group consisting of a cis-polyhydric alcohol having hydroxyl groups at an α- or β-position; catechol; and an α-hydroxycarboxylic acid as a dissolution agent for the boron compound.

2. A process of claim 1 wherein said water soluble-compound is a polyhydric alcohol selected from the group consisting of glycerine, erythritol, mannitol, ethylene glycol, or propylene glycol.

3. A process according to claim 1, wherein said water soluble compound is catechol.

4. A process of claim 1, wherein said water-soluble compound is an α-hydroxycarboxylic acid selected from the group consisting of tartaric acid and malic acid.

5. A process of claim 1, wherein any of said vanadium oxide, chromium oxide and boron oxide may be initially present in a form capable of conversion to the oxide.

6. A process of claim 5 wherein said vanadium oxide is produced in situ from ammonium metavanadate, vanadyl sulfate, vanadyl oxalate or vanadyl tartarate.

7. A process of claim 5 wherein said chromium oxide is produced in situ from chromic acid, chromium nitrate, ammonium chromate, chromium oxalate or chromium tartarate.

8. A process of claim 5 wherein said boron oxide is produced from boric acid or ammonium borate.

9. A process according to claim 1, wherein the spray-drying is effected at an outlet temperature of 85° to 160° C.

10. A process according to claim 1, wherein the catalyst has an atomic ratio of V:Cr:B being 1:0.5–2.0:0.1–1.2, a total amount of their oxides carried on the catalyst being 20 to 80% by weight, based on the weight of the catalyst when the respective oxides are defined as $V_2O_5$, $Cr_2O_3$ and $B_2O_3$, and a closed bulk density of 0.85 to 1.20 g./ml.

References Cited

UNITED STATES PATENTS

| | | | |
|---|---|---|---|
| 1,694,620 | 12/1928 | Jaeger | 252—432 X |
| 1,991,448 | 2/1935 | Connolly et al. | 252—432 X |
| 2,863,838 | 12/1958 | Vincent | 252—432 |
| 2,898,326 | 8/1959 | Peters et al. | 252—432 |

HELEN M. S. SNEED, Primary Examiner

U.S. Cl. X.R.

260—465